(12) United States Patent
Huebner et al.

(10) Patent No.: US 9,358,929 B1
(45) Date of Patent: Jun. 7, 2016

(54) INTERIOR TRIM ELECTRONIC DEVICE HOLDER

(71) Applicant: Ford Global Technologies, LLC, Dearborn, MI (US)

(72) Inventors: Annette Lynn Huebner, White Lake, MI (US); Kristin Ann Hellman, Walled Lake, MI (US); Joshua Greiner, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/601,594

(22) Filed: Jan. 21, 2015

(51) Int. Cl.
*B60R 7/04* (2006.01)
(52) U.S. Cl.
CPC .......................................... *B60R 7/04* (2013.01)
(58) Field of Classification Search
CPC ........................................................ B60R 7/04
See application file for complete search history.

(56) References Cited

U.S. PATENT DOCUMENTS

| 6,966,533 | B1 | 11/2005 | Kalis et al. |
| 7,650,230 | B1 | 1/2010 | Laverick et al. |
| 8,727,192 | B2 | 5/2014 | Lai |

FOREIGN PATENT DOCUMENTS

DE   102011107660   1/2013

OTHER PUBLICATIONS

Smart Fortwo Passion Coupe 2008-2014 ProClip Left Mount, http://www.proclipusa.com/dashboard-mounts/vehicle/smart/fortwo-passion-coupe/2008-2014/proclip-left-mount-804247-17429.cmsv, Sep. 9, 2014, Pro-Clip USA.

*Primary Examiner* — Lori L Lyjak
(74) *Attorney, Agent, or Firm* — Vichit Chea; Price Heneveld LLP

(57) ABSTRACT

An electronic device holder includes a vehicle pillar in which a vertical track assembly is disposed. First and second pivoting arms are pivotally coupled to the track assembly and are vertically adjustable along a length of the track assembly between release and cinched positions. The first and second pivoting arms are configured to be unfolded from a stowed position to an extended position. The first and second pivoting arms are configured to retain an electronic device between inner surfaces of the first and second pivoting arms, when the first and second pivoting arms are in the cinched position around the electronic device.

20 Claims, 9 Drawing Sheets

INTERIOR TRIM ELECTRONIC DEVICE HOLDER

FIELD OF THE INVENTION

The present invention relates to an electronic device holder for use in a vehicle interior, and more particularly, to an electronic device holder having first and second pivoting arms which are disposed in a vehicle pillar, wherein the first and second arms are spaced apart to define a gap in which an electronic device is removeably received.

BACKGROUND OF THE INVENTION

Portable devices are widely used and becoming commonplace in a variety of settings. One particular setting involves use of such devices inside a traveling vehicle to entertain the vehicle occupants and enhance a trip experience. Popular portable devices often include navigation units, mobile cellular devices having navigation applications, DVD players, and tablets used for viewing movies and the like. Power for such mobile devices may be accommodated through a vehicle's preexisting power supply input such as a cigarette lighter or an auxiliary power port. The portable device is then, often times, held by a vehicle occupant seated in the second row or third row seating areas where the portable device is not properly secured and not easily accessible or visible to vehicle occupants. Known portable device holders are often complex in nature for the positioning and retention of a portable device therein. Thus, it is desirable to provide an adjustable portable electronic device holder that is integrated into and concealed within a vehicle interior, while providing features that facilitate the secure loading and unloading of the portable electronic device by the vehicle passengers.

SUMMARY OF THE INVENTION

One aspect of the present invention includes an electronic device holder disposed in a vehicle pillar, wherein the vehicle pillar includes a track assembly. First and second pivoting arms are operably coupled to the track assembly and are moveable between stowed and extended positions with respect to the vehicle pillar. The first and second pivoting arms are slideably supported on the track assembly, such that the first and second pivoting arms are vertically adjustable along the track assembly between release and cinched positions. The first and second pivoting arms are configured to retain an electronic device therebetween when the first and second pivoting arms are in the cinched position.

Another aspect of the present invention includes an electronic device holder disposed in a vehicle pillar. A track assembly is disposed within a body portion of the vehicle pillar. A first pivoting arm is pivotally coupled to the track assembly and vertically adjustable along the track assembly. A second pivoting arm is pivotally coupled to the track assembly. The first and second pivoting arms are configured to retain an electronic device therebetween as the first pivoting arm is moved towards the second pivoting arm along the track assembly.

Yet another aspect of the present invention includes an electronic device holder disposed in a vehicle pillar, wherein the vehicle pillar includes a vertical track assembly disposed therein. A first pivoting arm is slideably supported on the track assembly. A second pivoting arm is slideably supported on the track assembly and spaced-apart from the first pivoting arm to define a gap therebetween. An electronic device is removeably received in the gap between the first and second pivoting arms.

These and other features, objects and advantages of the present invention will become apparent upon reading the following description thereof together with reference to the accompanying drawings.

DETAILED DESCRIPTION OF THE PREFERRED EMBODIMENTS

Figure 1:
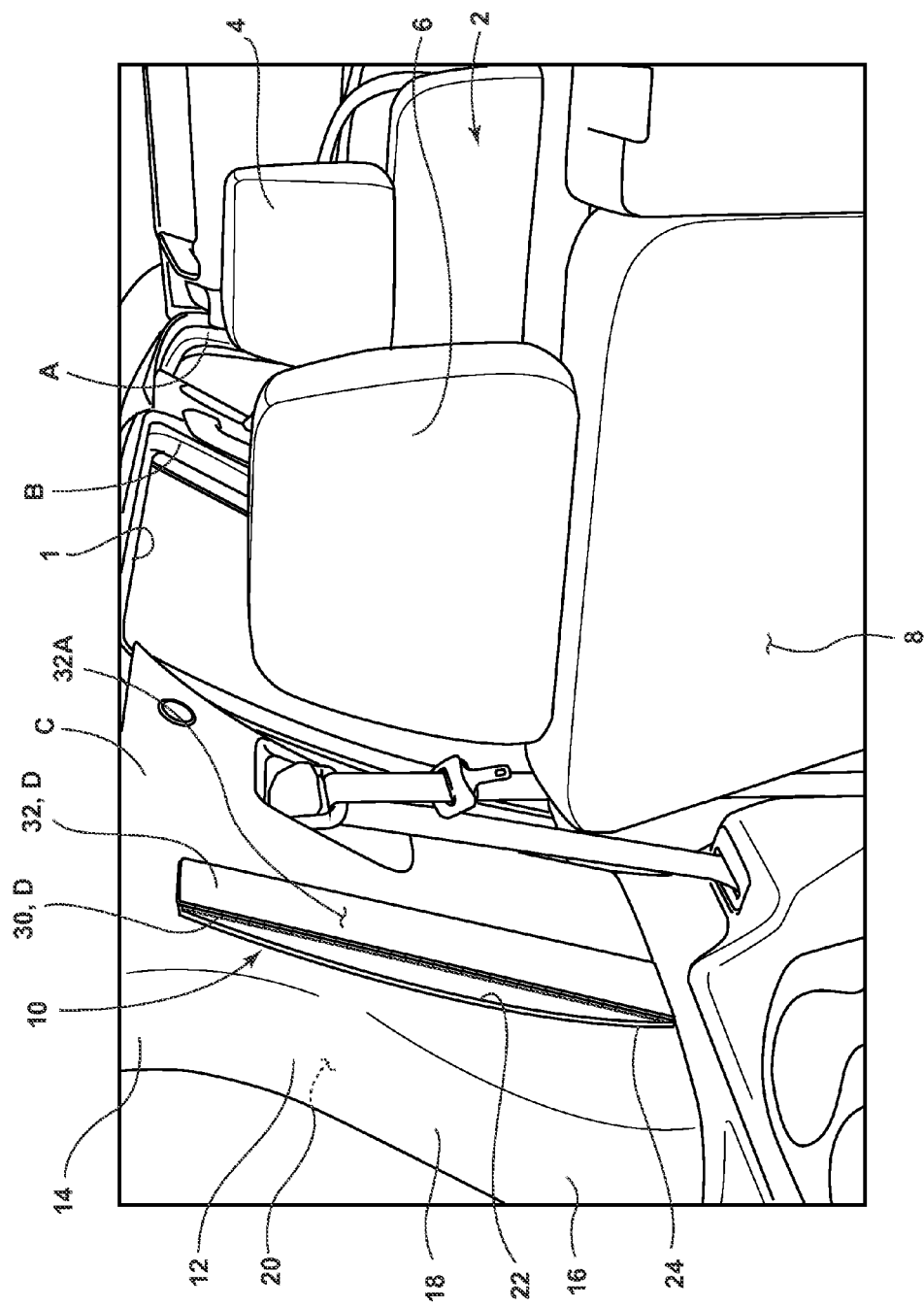
FIG. 1 is a fragmentary perspective view of a vehicle interior having a pillar with an electronic device holder according to an embodiment of the present invention disposed thereon.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle 1 is shown having a vehicle interior 2 which includes a driver seat 4, a second row passenger seat 6, and a third row seating area 8. The vehicle 1 further includes a number of interior vehicle pillars identified as an A pillar A, a B pillar B and a C pillar C. An electronic device holder 10 is shown disposed on the C pillar adjacent the third row passenger seating area 8. For purposes of the present disclosure, the electronic device holder 10 will be described as disposed in the C pillar of the vehicle 1, however, is contemplated that the electronic device holder 10 of the present invention could be disposed on other interior pillars in the vehicle 1, or integrated into any other interior trim assembly where an electronic device holder is desired. The C pillar, as shown in FIG. 1, includes a body portion 12 having upper and lower portions 14, 16. The body portion 12 is generally defined and covered by an outer cover 18 which further defines a cavity portion 20 of the C pillar and provides an A-class surface for the C pillar.

As further shown in FIG. 1, the electronic device holder 10 includes a housing 22 which is disposed within an aperture 24 formed in the body portion 12 of the C pillar. The electronic device holder 10 further includes first and second pivoting arms 30, 32 which pivot with respect to the C pillar between stowed and extended positions as further described below. In the embodiment of FIG. 1, the electronic device holder 10 is shown having the first and second pivoting arms 30, 32 in the stowed position D, wherein the second pivoting arm 32 substantially conceals first pivoting arm 30 by generally covering the first pivoting arm 30. In the stowed position D, the second pivoting arm 32 also serves to substantially close the aperture 24 formed in the body portion 12 of the C pillar. The second pivoting arm 32 includes an A-side outer surface 32A which is contemplated to have a finish similar to that of the outer cover 18 of the C pillar, such that the second pivoting arm 32 substantially conceals the electronic device holder 10 as disposed on the C pillar. The first and second pivoting arms 30, 32 are folding arms which can be folded into the stowed position D, and unfolded towards an extended position as further described below.

Figure 2A:
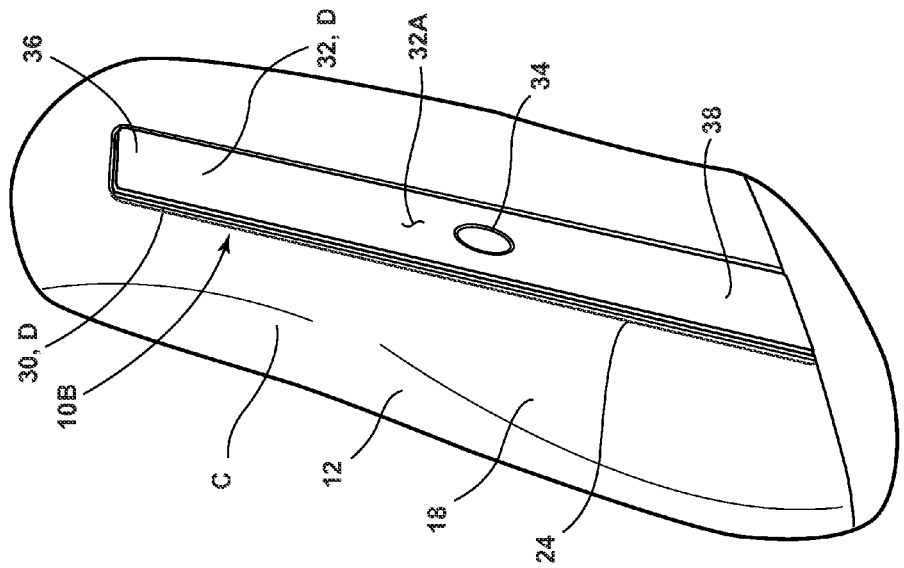
FIG. 2A is a perspective view of another embodiment of an electronic device holder disposed in the pillar of FIG. 1.
Figure 2B:
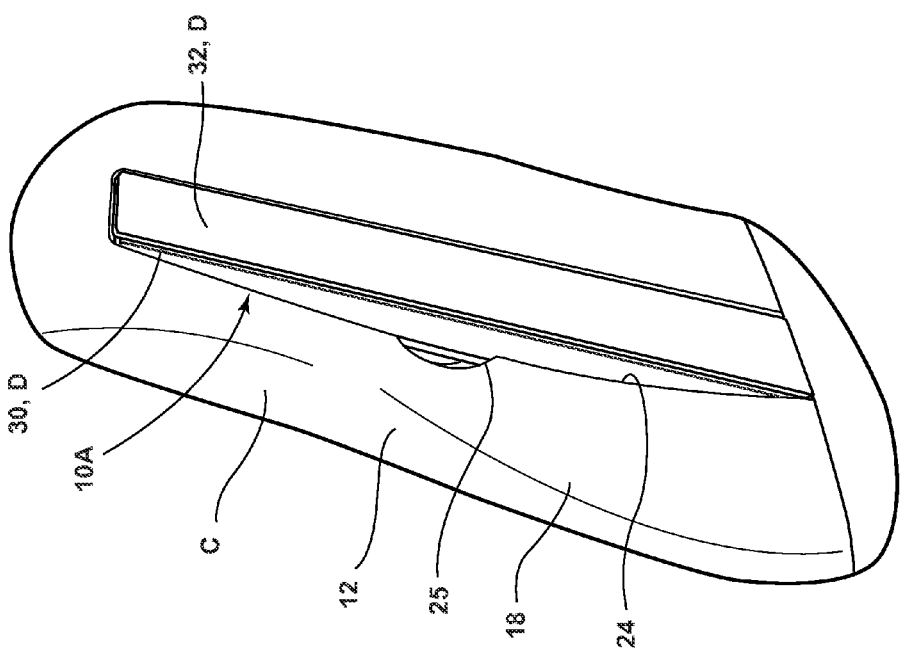
FIG. 2B is a perspective view of another embodiment of an electronic device holder disposed in the pillar of FIG. 1.

Referring now to the embodiment of the electronic device holder 10A shown in FIG. 2A, the aperture 24 formed in the C pillar includes a relief portion 25 which can be used to aid a vehicle occupant in extending a finger behind the first and second pivoting arms 30, 32 to release the first and second pivoting arms 30, 32 from the stowed position D. Referring now to the embodiment of the electronic device holder 10B shown in FIG. 2B, an actuator button 34 is disposed on the outer surface 32A of the second pivoting arm 32 which may be in the form a push-push actuator button which is configured to release the second pivoting arm 32 from the stowed position D. As shown in FIGS. 1, 2A and 2B, the electronic device holders 10, 10A and 10B are depicted with the first and second pivoting arms 30, 32 in the stowed position D with respect to the C pillar. It is contemplated that the first and second pivoting arms 30, 32 are retained in the stowed position D by a latch mechanism which may include a push-push latch mechanism, a magnetic coupling system, or other like mechanism known in the art adequate to retain the first and second pivoting arms 30, 32 in the stowed position D, such that the first and second pivoting arms 30, 32 do not disengage and move to the extended position without a positive action by the vehicle occupant. As further shown in FIG. 2B, the second pivoting arm 32 includes a distal end 36 and a proximal end 38, wherein it is contemplated that the proximal end 38 is pivotally coupled to the C pillar. For purposes of the present disclosure, it is contemplated that the second pivoting arm 32 may be coupled to the housing 22, the outer cover 18 of the C pillar or a track assembly disposed within the housing 22 or body portion 12 of the C pillar as further described below. The first pivoting arm 30 also includes distal and proximal ends 40, 42 (FIG. 3) and is also contemplated to be pivotally coupled to the C pillar at the proximal end 42 as further described below.

Figure 3:
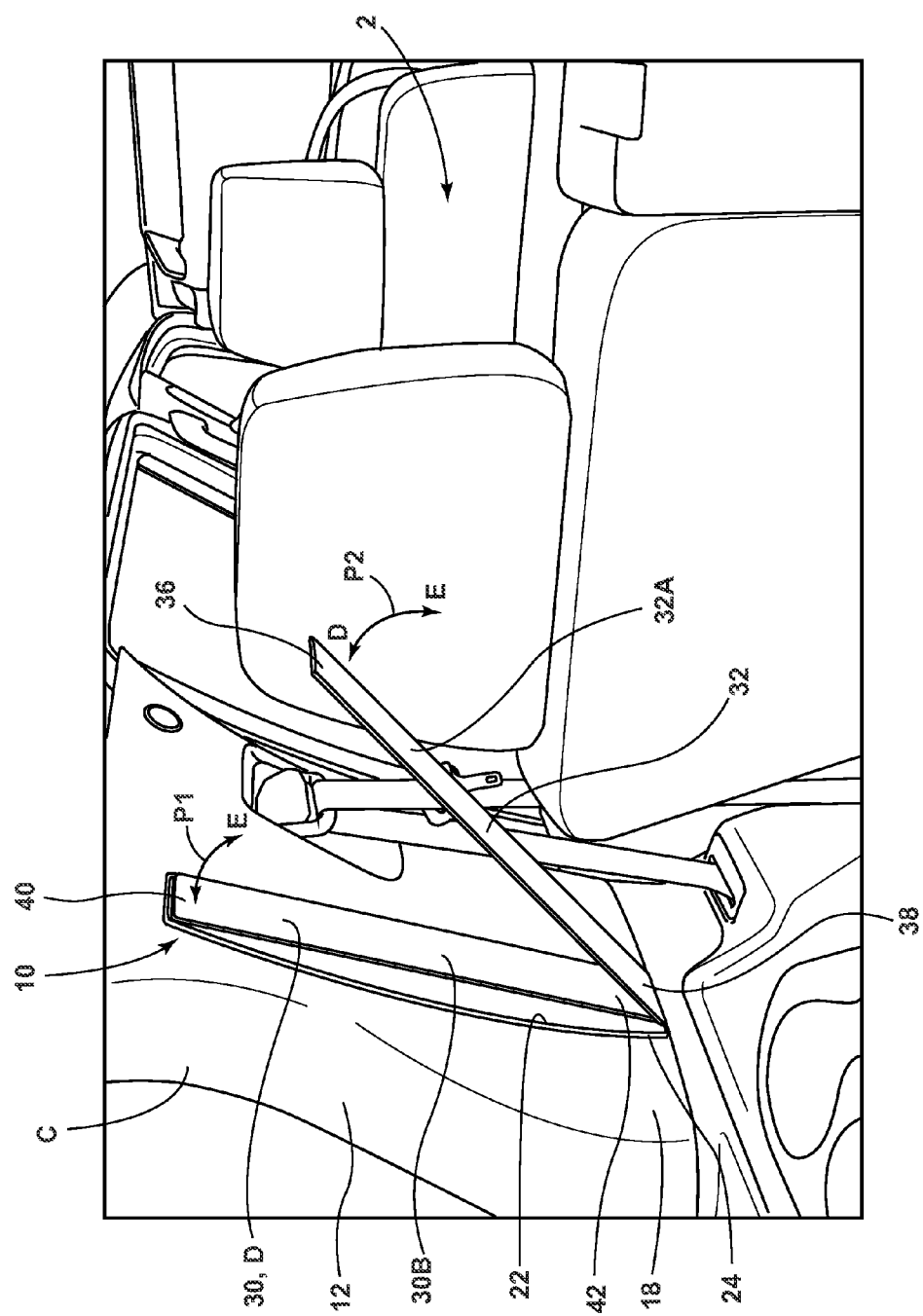
FIG. 3 is a perspective view of the electronic device holder of FIG. 1 showing relative movement of a pivoting arm pivoting from a stowed position towards an extended position.

Referring now to FIG. 3, the electronic device holder 10 is shown having the second pivoting arm 32 released from the housing 22 and pivoting or unfolding downward along a path as indicated by arrow P2 towards the extended position E. As the second pivoted arm 32 moves towards the extended position E, the first pivoting arm 30 is revealed having an inner surface 30B as well as distal and proximal ends 40, 42, wherein it is contemplated that the proximal end 42 is pivotally coupled to the C pillar. For purposes of the present disclosure, it is contemplated that the first pivoting arm 30 may be coupled to the housing 22, the outer cover 18 of the C pillar or a track assembly disposed within the housing 22 or body portion 12 of the C pillar as further described below. The first pivoting arm 30 pivots from the stowed position D to the extended position E along a path as indicated by arrow P1. Thus, the first and second pivoting arms 30, 32 both pivot from a bottom portion of the housing 22 at proximal ends 38, 42 to reach their respective extended positions E.

Figure 4A:
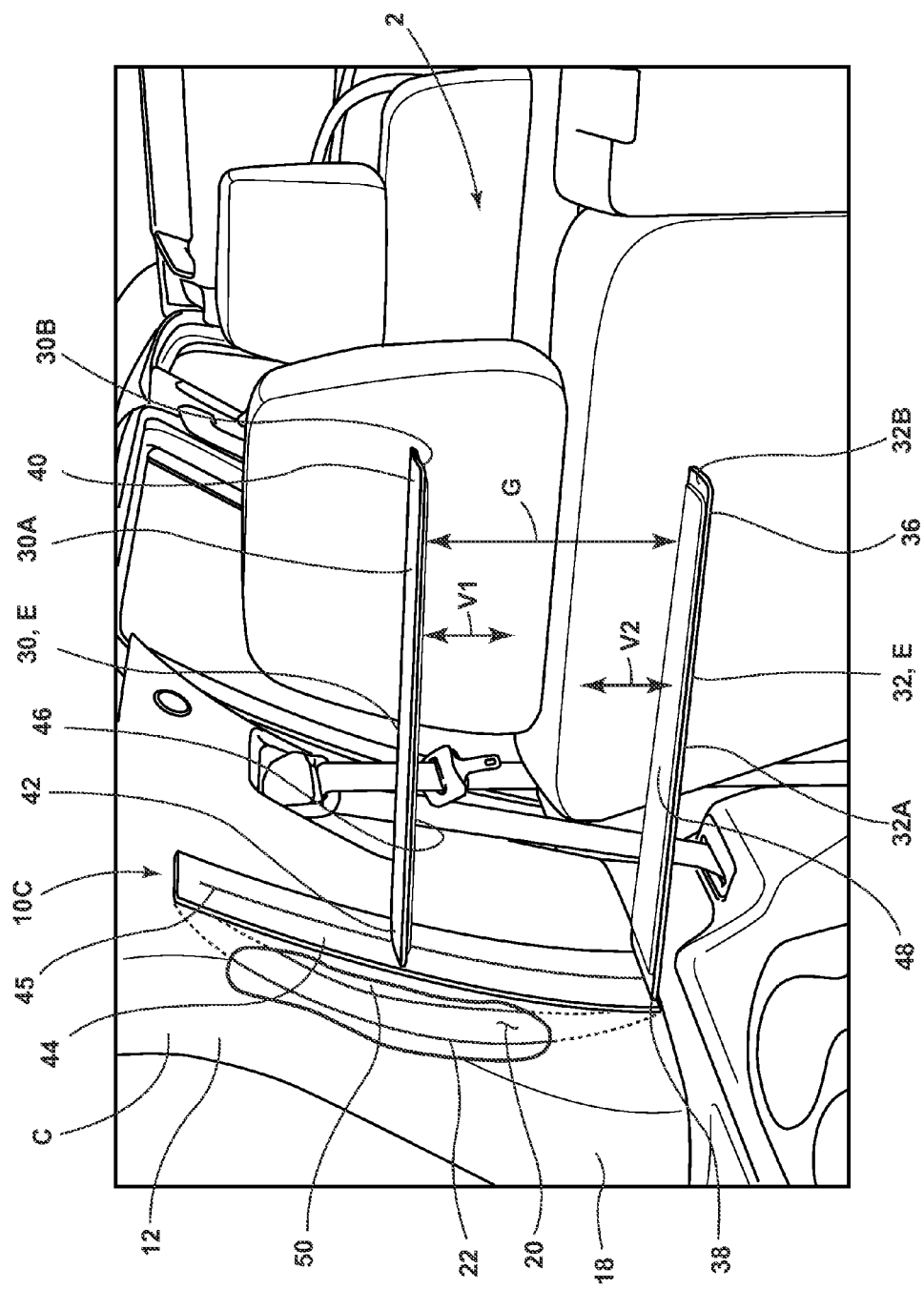
FIG. 4A is a perspective view of the electronic device holder of FIG. 3 showing upper and lower pivoting arms in extended positions with cushioned material disposed on landing portions of the pivoting arms.

Referring now to FIG. 4A, the electronic device holder 10C is shown with both the first and second pivoting arms 30, 32 in their extended or unfolded positions E, wherein the first and second pivoting arms 30, 32 are substantially perpendicular to the C pillar. As further shown in FIG. 4A, the first pivoting arm 30 has been moved vertically upward along a track assembly 50, such that the first and second pivoting arms 30, 32 are spaced-apart from one another to define a gap G therebetween. Thus, it is contemplated that the first pivoting arm 30, or upper pivoting arm, is pivotally coupled to the track assembly 50 and has moved vertically in a direction as indicated by arrow V1 to a raised position shown in FIG. 4A along the track assembly 50, which is a vertical track assembly. The second pivoting arm 32, or lower pivoting arm, is also shown in the extended position E, however, the second pivoting arm 32 has not been moved vertically. The second pivoting arm 32 is also suitable for vertical movement along the track assembly 50, as the second pivoting arm 32 may also be pivotally coupled to the track assembly 50. Thus, it is contemplated that either pivoting arm 30, 32 could be a vertically stationary pivoting arm. In such a configuration, second pivoting arm 32 could be a stationary pivoting arm that is pivotally coupled at the proximal end 38 to the C pillar at the housing 22 or outer cover 18 of the C pillar, while the first pivoting arm 30 is vertically movable along track assembly 50 in the direction as indicated by arrow V1. In the embodiment shown in FIG. 4A the electronic device holder 10C is contemplated to have first and second pivoting arms 30, 32 hingedly or pivotally coupled to the track assembly 50 for vertical adjustment of both the first and second pivoting arms 30, 32 along the track assembly 50 on which the arms are slideably supported.

The track assembly 50, which is described in more detail below, is concealed behind a track cover 44 disposed on the housing 22 an over the track assembly 50, wherein the track cover 44 further includes a generally centrally disposed slit 45 therethrough. The first and second pivoting arms 30, 32 can move vertically as indicated by arrows V1, V2, respectively, along the track assembly 50 through the track cover 44 at slit 45. Thus, the track cover 44 conceals the hinged coupling of the first and second pivoting arms 30, 32 that extend through the slit 45 couple the first and second pivoting arms 30, 32 to the track assembly 50. As further shown in the embodiment of FIG. 4A, the first pivoting arm 30 includes outer surface 30A and inner surface 30B, wherein a cushion material 46 is disposed on the inner surface 30B. Similarly, the second pivoting arm 32 includes outer surface 32A, described above, and inner surface 30B, wherein a cushion material 48 is disposed on the inner surface 30B. The inner surfaces 30B, 32B of the first and second pivoting arms 30, 32 define landings which are used to contact and positively capture an electronic device. The inner surfaces 30B, 32B defined landings for the first and second pivoting arms 30, 32 when the first and second pivoting arms 30, 32 are in the extended position E, such that the landings are substantially horizontal landing areas. The cushion material 46, 48 disposed on the inner surfaces 30B, 32B of the first and second pivoting arms 30, 32 is contemplated to be a flexibly resilient material, such as a sponge or memory foam type material, that can engage an electronic device in a slip-free and rattle-resistant manner.

Figure 4B:
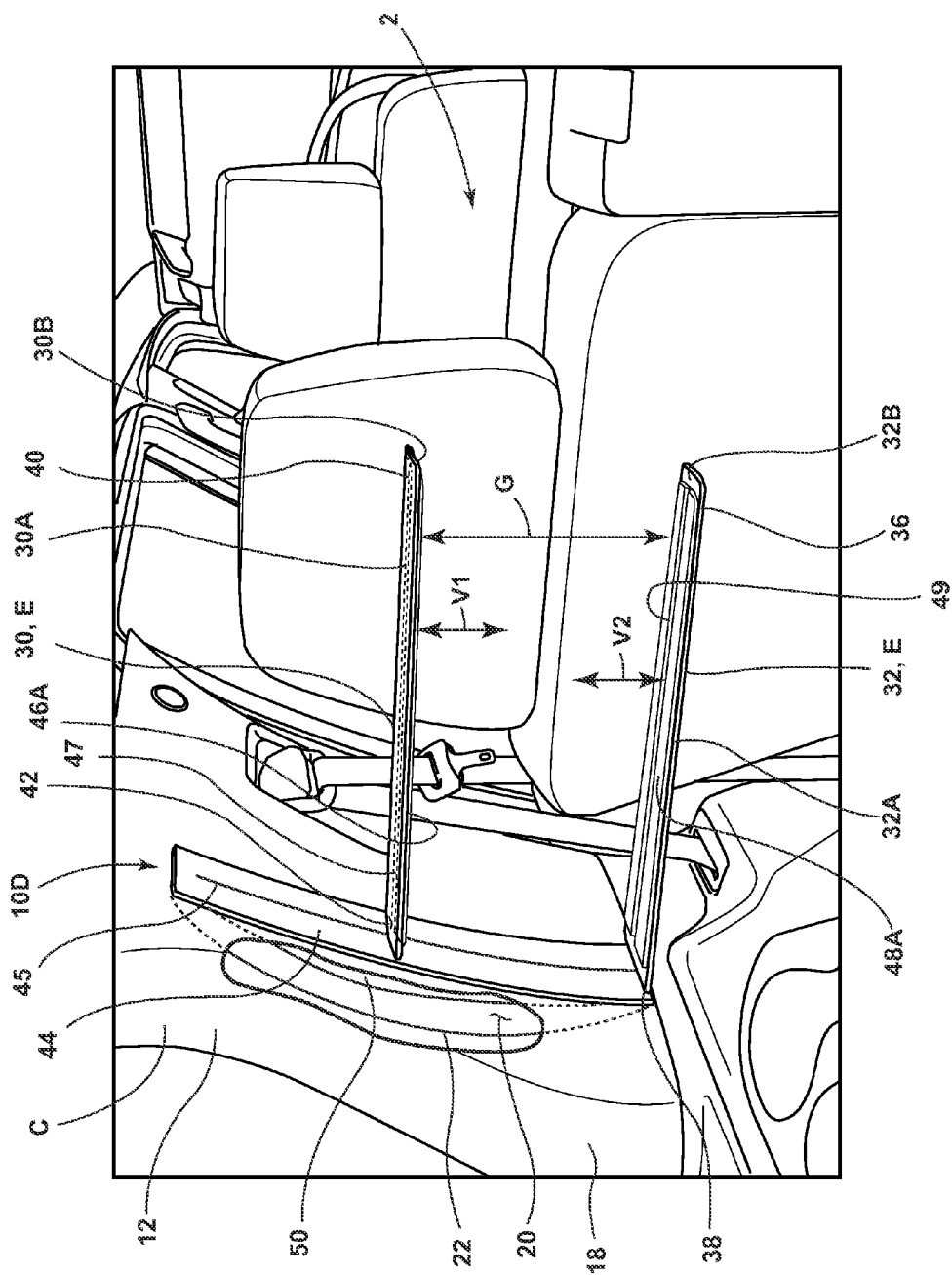
FIG. 4B is a perspective view of the electronic device holder of FIG. 4A with channels disposed on the landing portions of the pivoting arms.

Referring now to FIG. 4B, another embodiment of the electronic device holder 10D includes semi-rigid cushion material 46A, 46B disposed on the landings or inner surfaces 30B, 32B of the first and second pivoting arms 30, 32. The semi-rigid cushion materials 46A, 46B, as shown in FIG. 4B, further include a generally centrally disposed channel or slot 47, 49, respectively, which helps to locate an electronic device to the inner surfaces 30B, 32B of the first and second pivoting arms 30, 32, and further facilitate the engagement of the electronic device as removeably received within the gap G between the first and second pivoting arms 30, 32. The semi-rigid cushion material 46A, 48A is also flexibly resilient, but generally contemplated to be more rigid than the cushion material 46, 48 shown in the embodiment of FIG. 4A. It is contemplated that the cushion materials 46, 48, 46A, 46B, may be adhered to the inner surfaces 30B, 32B of the first and second pivoting arms 30, 32 by an adhesive material.

As noted above, the electronic device holder 10 is configured to capture an electronic device between the first and second pivoting arms 30, 32 at the inner surfaces 30B, 32B of the first and second pivoting arms 30, 32, wherein the first and second pivoting arms 30, 32 are vertically movable along a track assembly 50, as shown in FIG. 4A, to customize a vertical viewing position of the electronic device as retained in the electronic device holder 10. The capturing or retaining of an electronic device between the first and second pivoting arms 30, 32 will now be described.

Figure 5:
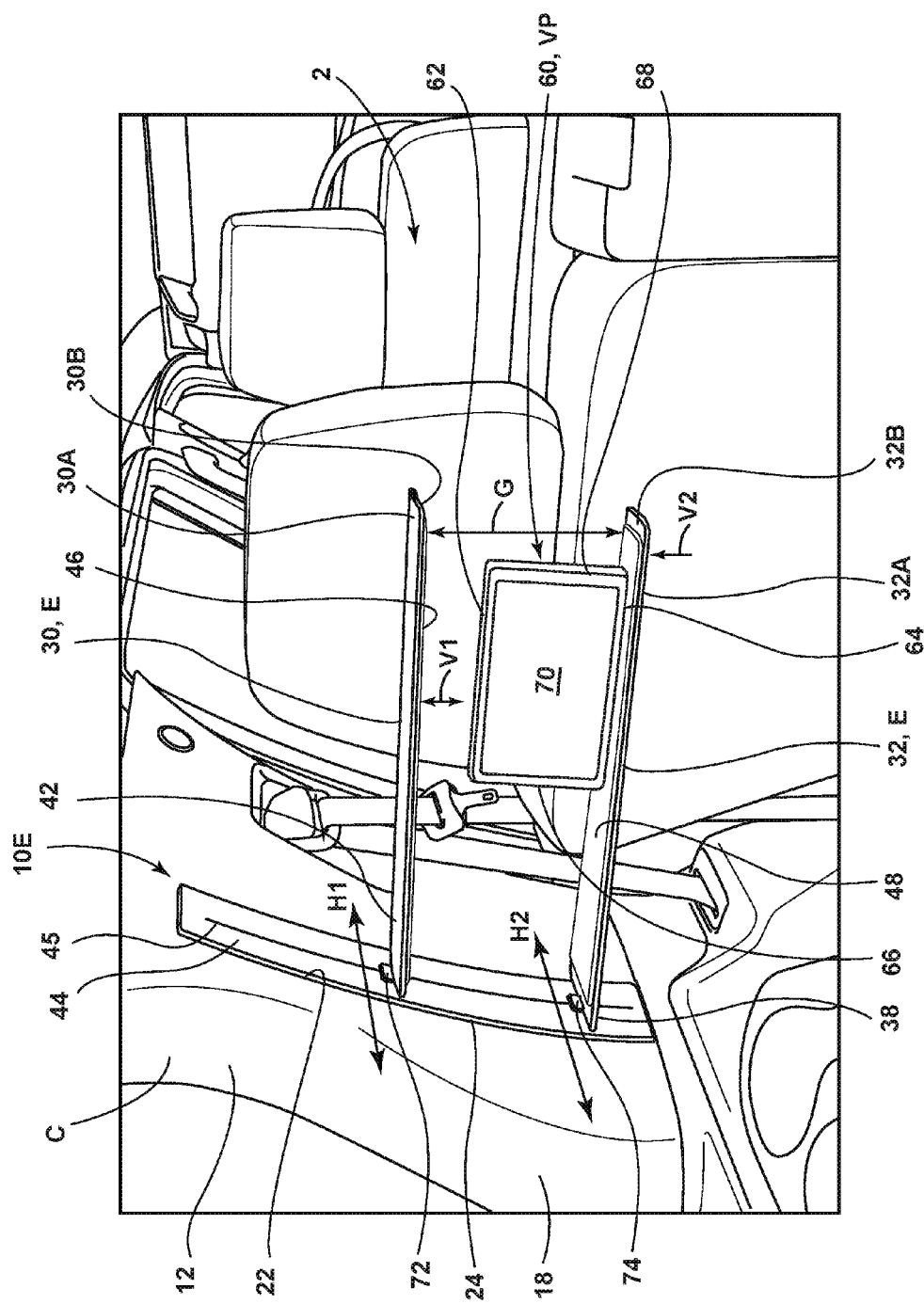
FIG. 5 is a perspective view of the electronic device holder of FIG. 4A with an electronic device disposed in a gap between the pivoting arms.

Referring now to FIG. 5, a portable electronic device 60 is shown as positioned on the cushion material 48 of inner surface 32B of second pivoting arm 32. Second pivoting arm 32 has been moved vertically along the path as indicated by arrow V2 to provide a customized height for the portable electronic device 60 at a viewing position VP. In this way, the electronic device holder 10E of the present invention allows for the vehicle occupant to select a viewing position VP disposed along a length of the track assembly 50 (FIG. 4A) that is specifically tailored for optimal visibility of a display screen by the vehicle occupant. As used herein, the phrase "viewing position" refers to a customized height set by the vehicle occupant for best viewing a display screen of the portable electronic device 60. As shown in FIG. 5, the portable electronic device 60 includes upper and lower sides 62, 64 as well as side walls 66, 68 which all surround display screen 70. It is contemplated that the portable electronic device 60 can be any portable electronic device that is used for entertainment or navigation purposes, or any other like use desired by a vehicle passenger. Such portable electronic devices include, but are not limited to, mobile phones, tablets, DVD players, navigation devices, and the like. As shown in FIG. 5, the lower side 64 of the portable electronic device 60 is in contact with the cushion material 48 of second pivoting arm 32. The gap G defined between the first pivoting arm 30 and the second pivoting arm 32 must be closed in order to positively capture the portable electronic device 60 between the first and second pivoting arms 30, 32. As shown in FIG. 5, the first and second pivoting arms 30, 32 are in a release position, wherein the portable electronic device 60 can be released from the electronic device holder 10E. As noted above, the first and second pivoting arms 30, 32 are vertically adjustable and slideably supported along the track assembly 50 (FIG. 4A) as pivotally coupled thereto. It is contemplated that the adjustment of the upper and lower pivoting arms 30, 32 is akin to the adjustment of a seatbelt shoulder height adjuster mechanism. Thus, as shown in FIG. 5, adjustment levers 72, 74 are disposed on upper and lower pivoting arms 30, 32 near the proximal ends 42, 38 thereof. The adjustment levers 72, 74 are contemplated to move laterally in the direction as indicated by arrows H1, H2 for releasing the first and second pivoting arms 30, 32 from the track assembly 50, such that the first and second pivoting arms 30, 32 are free to be vertically adjusted along the track assembly 50 in the direction as indicated by arrows V1, V2. Thus, in FIG. 5, it is contemplated that the vehicle occupant has released second pivoting arm 32 from the track assembly 50 by using adjustment lever 74 to free second pivoting arm 32 and raise the second pivoting arm 32 to the customized height shown in FIG. 5 along the path as indicated by arrow V2. The vehicle occupant will then release adjustment lever 74, such that the second pivoting arm 32 will once again engage the track assembly 50 and hold it vertical position thereon. Once this vertical position is set by the vehicle occupant, the electronic device 60 is placed on the cushion material 48 of lower pivoting arm 32. At this point, the vertical position of the upper pivoting arm 30 must be adjusted along the path as indicated by arrow V1 to positively capture the portable electronic device 60 between the landings of the first and second pivoting arms 30, 32.

Figure 6:
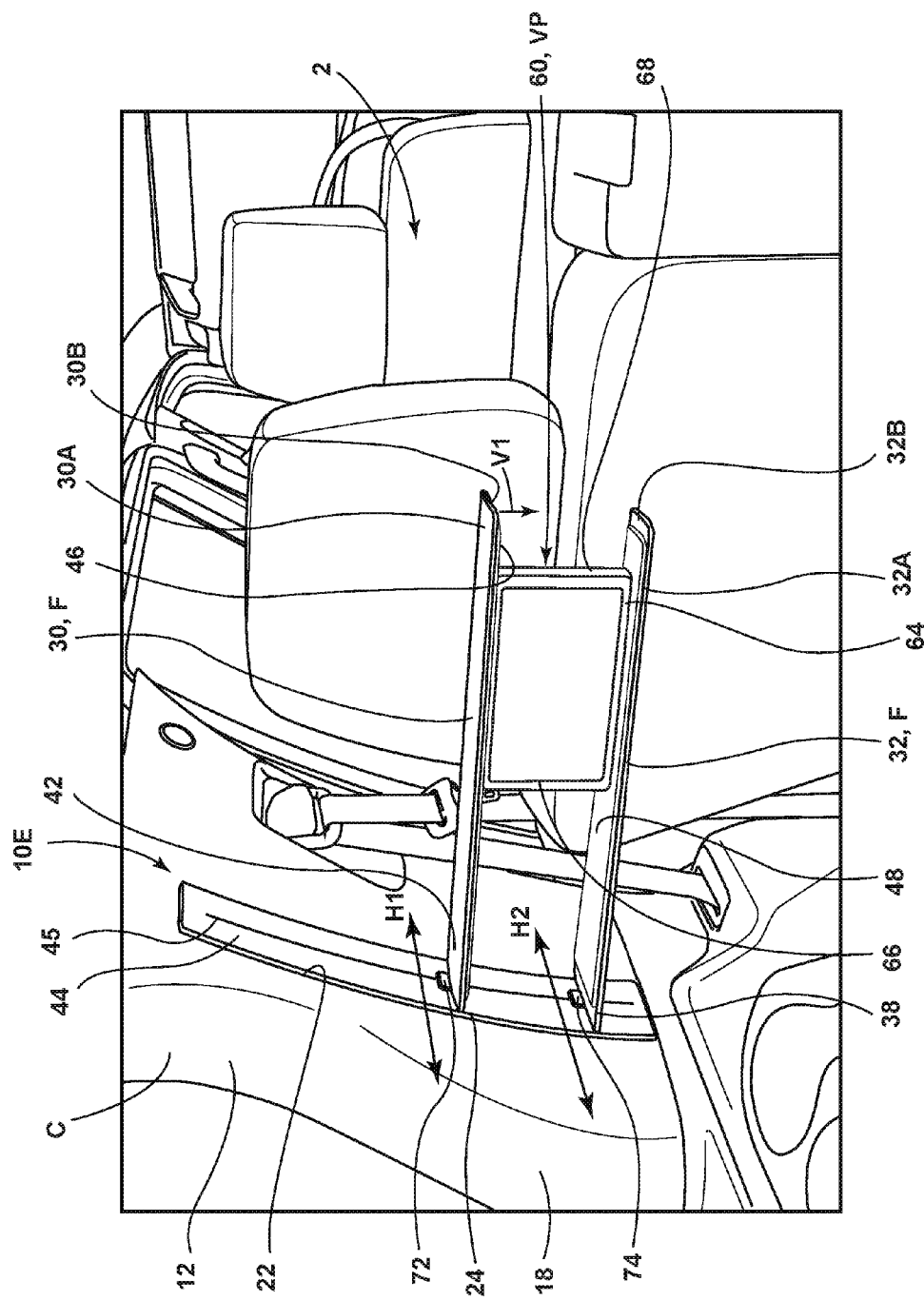
FIG. 6 is a perspective view of the electronic device holder of FIG. 5 with the upper pivoting arm cinched against the electronic device.

Referring now to FIG. 6, the first pivoting arm 30 has been moved downward in the direction as indicated by arrow V1, such that the upper side 62 of the portable electronic device 60 is in contact with the cushion material 46 disposed on the inner surface 30B of the first pivoting arm 30, while the lower side 64 of the portable electronic device 60 is in contact with the cushion material 48 disposed on the inner surface 32B of the second pivoting arm 32. Adjusting the vertical position of the first pivoting arm 30 is contemplated to be carried out by using the adjustment lever 72 to release the first pivoting arm 30 from the track assembly 50 for vertical adjustment along a length of the track assembly as indicated by arrow V1. The vertical adjustment of the first and second pivoting arms 30, 32 is contemplated to be infinite along the length of the track assembly 50, such that the electronic device holder 10E can be used to positively capture electronic devices of varying sizes between the first and second pivoting arms 30, 32. In this way, the first and second pivoting arms 30, 32 are in a cinched position F around the electronic device 60 which is vertically disposed at viewing position VP. As the electronic device is positively captured or cinched between the first and second pivoting arms 30, 32, it is contemplated that the cushion material 46 of the first pivoting arm 30 and the cushion material 48 of the second pivoting arm 32 are partially depressed, such that the portable electronic device 60 is retained in a slip-free and rattle-resistant manner within the electronic device holder 10E. When the vehicle occupant wishes to remove the portable electronic device 60 from the electronic device holder 10E, the vehicle occupant will adjust the vertical height of one of the first and second pivoting arms 30, 32 to increase the gap G therebetween, thereby moving the first or second pivoting arms 30, 32 to the release position (FIG. 5) from the cinched position F (FIG. 6) to release the portable electronic device 60 from the first and second pivoting arms 30, 32. The user can then return the first and second pivoting arms 30, 32 to the lowermost position along the track assembly 50, such that the first and second pivoting arms 30, 32 can be pivoted along the paths as indicated by arrows P1, P2 (FIG. 3) for movement from the extended position E, to the stowed position D (FIG. 1). In this way, the electronic device holder 10, as shown in FIG. 1, is substantially integrated and concealed within the C pillar of the vehicle 1, wherein it is contemplated that the first and second pivoting arms 30, 32 are latched into place in the stowed position D. As used herein, the phrase "substantially integrated" means that the first and second pivoting arms 30, 32 generally follow the contours of the C pillar when the first and second pivoting arms 30, 32 are in the stowed position D. The phrase "substantially integrated" further means that the componentry, such as the housing 22 and track assembly 50, are disposed within the body portion 12 or cavity portion 20 of the C pillar.

Figure 7:
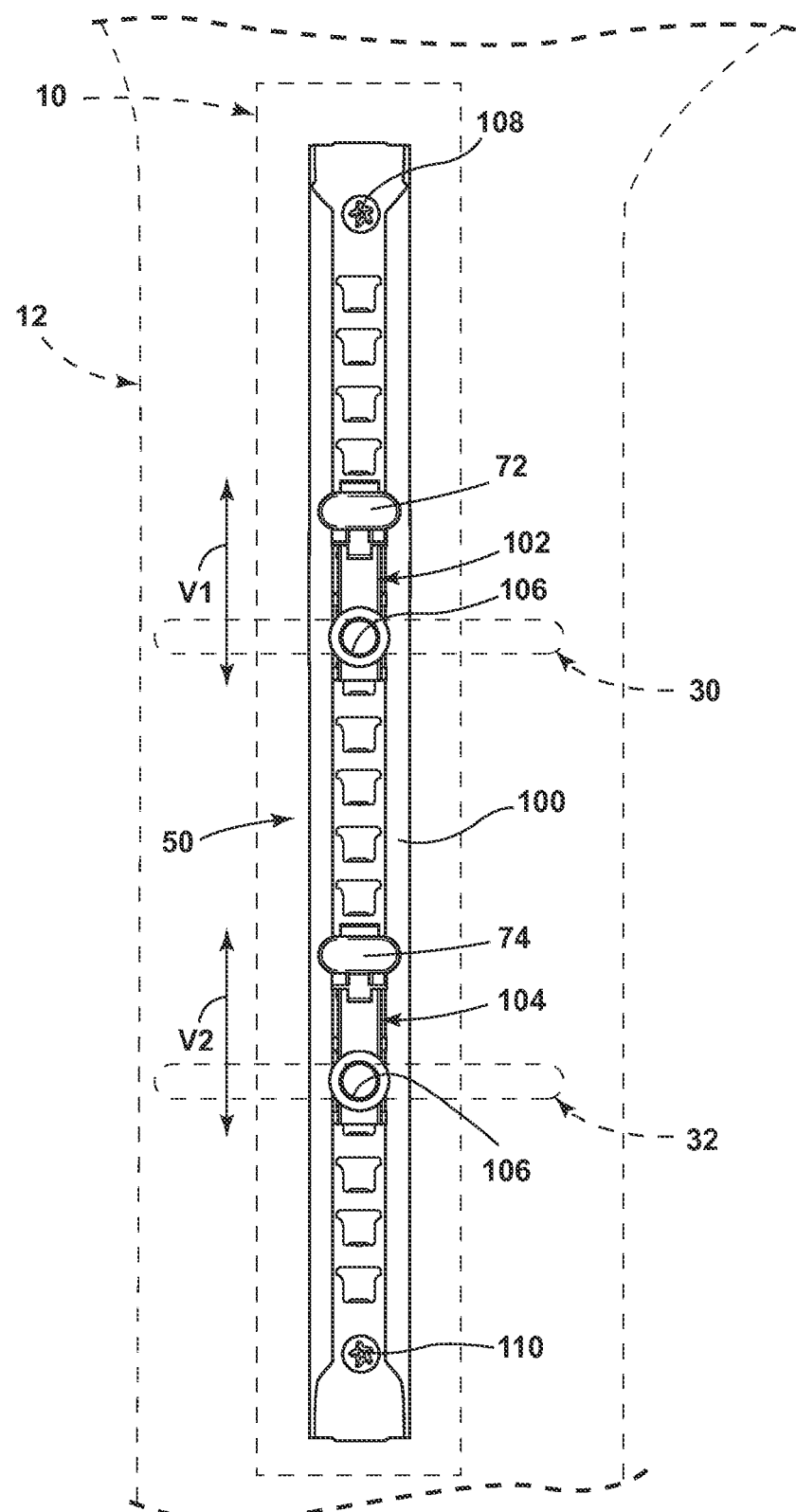
FIG. 7 is a top plan view of a track assembly.
Figure 8:
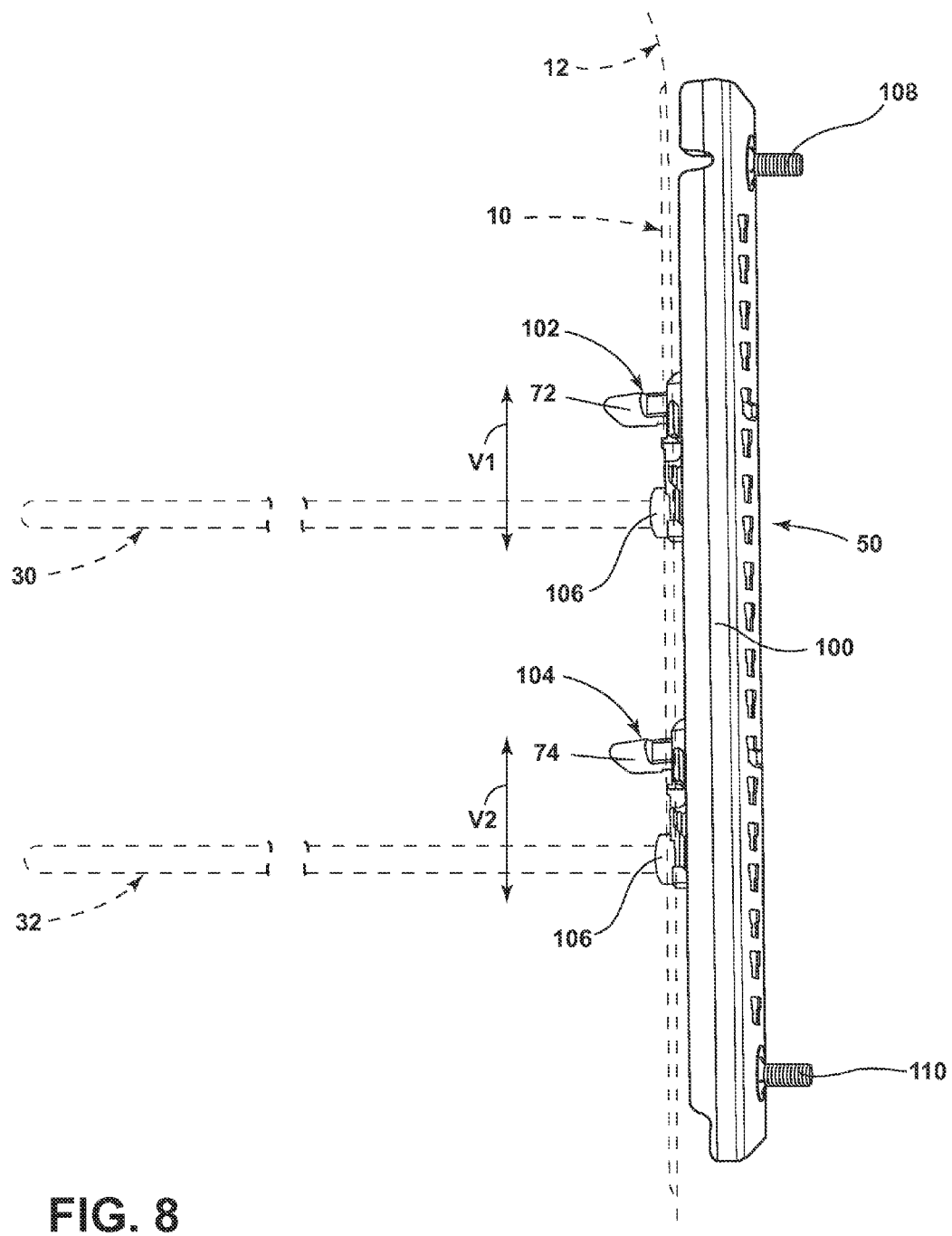
FIG. 8 is a side perspective view of the track assembly of FIG. 7.

Referring now to FIGS. 7 and 8, an exemplary embodiment of a track assembly 50 is shown. The track assembly includes upper and lower carriers 102, 104 which are slideably supported on a rail 100. The rail 100 includes upper and lower apertures 108, 110 for coupling the track assembly 50 to an appropriate mounting location disposed within the body portion 12 of a vehicle pillar. Carrier 102 is configured to move vertically along rail 100 in the direction as indicated by arrow V1 when carrier 102 is released for movement by the actuation of adjustment lever 72. Carrier 104 is also configured to move vertically along rail 100 in the direction as indicated by arrow V2 when carrier 104 is released for movement by the actuation of adjustment lever 74. The carriers 102, 104 are configured for infinite movement and positioning along rail 100, such that the pivoting arms 30, 32 can cinch down on a portable electronic device of nearly any configuration or shape. In assembly, carrier 102 is configured to receive first pivoting arm 30, shown in phantom, at attachment location 106. Similarly, carrier 104 also includes an attachment location 106 which is configured to receive second pivoting arm 32, also shown in phantom. Thus, the first and second pivoting arms 30, 32 couple to the upper and lower carriers 102, 104, respectively, for vertical movement along the track assembly 50 as supported on rail 100. The track assembly 50 shown in FIGS. 7 and 8 is exemplary only, and one of ordinary skill in the art will recognize that other track assemblies can be used for vertical adjustment of the first and second pivoting arms 30, 32.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An electronic device holder, comprising:
   a vehicle pillar having a track assembly; and
   first and second pivoting arms pivotally coupled to the track assembly, wherein the first and second pivoting arms are vertically adjustable along the track assembly between release and cinched positions, and further wherein the first and second pivoting arms are configured to retain an electronic device therebetween when the first and second pivoting arms are in the cinched position.

2. The electronic device holder of claim 1, wherein the first and second pivoting arms are pivotally coupled to the track assembly between stowed and extended positions.

3. The electronic device holder of claim 2, wherein the first and second pivoting arms are substantially integrated with the vehicle pillar in the stowed position.

4. The electronic device holder of claim 3, including:
   an actuator button configured to release the first and second pivoting arms from the stowed position, for movement to the extended position.

5. The electronic device holder of claim 1, wherein the first and second pivoting arms include inner and outer surfaces.

6. The electronic device holder of claim 5, wherein the inner surfaces of the first and second pivoting arms are spaced-apart when the first and second pivoting arms are in the release position to define a gap therebetween.

7. The electronic device holder of claim 6, including:
   a cushion material disposed on the inner surfaces of the first and second pivoting arms.

8. The electronic device holder of claim 7, wherein the cushion material disposed on the inner surfaces of the first and second pivoting arms is partially depressed against the electronic device when the first and second pivoting arms are in the cinched position.

9. An electronic device holder, comprising:
   a vehicle pillar;
   a track assembly disposed within a body portion of the pillar;

a first pivoting arm pivotally coupled to the track assembly and vertically adjustable therealong; and a second pivoting arm pivotally coupled to the track assembly, wherein the first and second pivoting arms are configured to retain an electronic device therebetween as the first pivoting arm is moved towards the second pivoting arm along the track assembly.

10. The electronic device holder of claim 9, wherein the second pivoting arm is vertically adjustable along the track assembly.

11. The electronic device holder of claim 10, wherein the first and second pivoting arms are foldable between stowed and extended positions.

12. The electronic device holder of claim 11, wherein the first and second pivoting arms include inner and outer surfaces, and further wherein the inner surfaces of the first and second pivoting arms define landings configured to removeably receive the electronic device.

13. The electronic device holder of claim 12, including:
a cushion material disposed on the landings of the first and second pivoting arms.

14. The electronic device holder of claim 13, wherein the cushion material disposed on the landings of the first and second pivoting arms further includes channels disposed therein.

15. The electronic device holder of claim 10, wherein the first and second pivoting arms further include adjustment levers configured to release the first and second pivoting arms for movement along the track assembly.

16. An electronic device holder, comprising:
a vehicle pillar having a vertical track assembly disposed therein;
a first pivoting arm slideably supported on the track assembly; and
a second pivoting arm slideably supported on the track assembly and spaced-apart from the first pivoting arm to define a gap therebetween, wherein an electronic device is removeably received in the gap between the first and second pivoting arms.

17. The electronic device holder of claim 16, wherein the first and second pivoting arms are vertically adjustable along the track assembly between release and cinched positions.

18. The electronic device holder of claim 17, wherein the electronic device is positively captured in a viewing position between the first and second pivoting arms when the first and second pivoting arms are in the cinched position.

19. The electronic device holder of claim 18, wherein the first and second pivoting arms include inner and outer surfaces, and further wherein the inner surfaces of the first and second pivoting arms include a cushion material that is partially depressed against the electronic device when the first and second pivoting arms are in the cinched position.

20. The electronic device holder of claim 16, including:
a track cover disposed over the track assembly, wherein the track cover includes a slit through which the first and second pivoting arms extend to couple to the track assembly.

* * * * *